April 9, 1946.  W. A. RAY  2,398,158
CONTROL SYSTEM
Filed March 1, 1943  2 Sheets-Sheet 1

Inventor:
WILLIAM A. RAY,
By John H. Rouse,
Attorney.

April 9, 1946.  W. A. RAY  2,398,158
CONTROL SYSTEM
Filed March 1, 1943  2 Sheets-Sheet 2
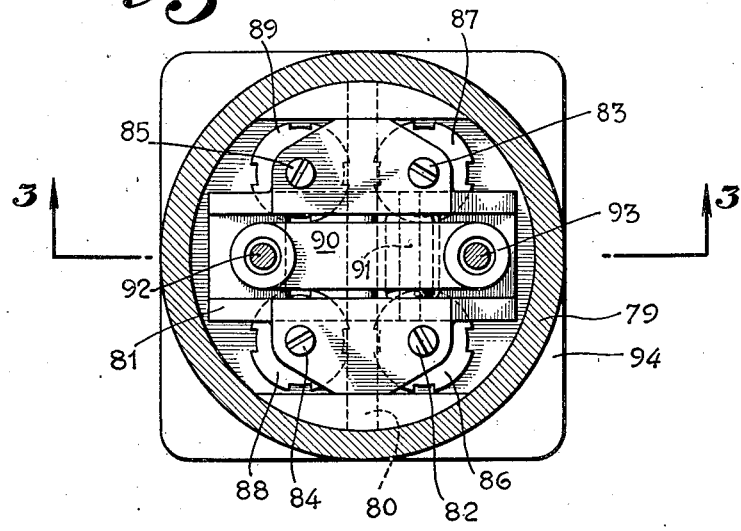
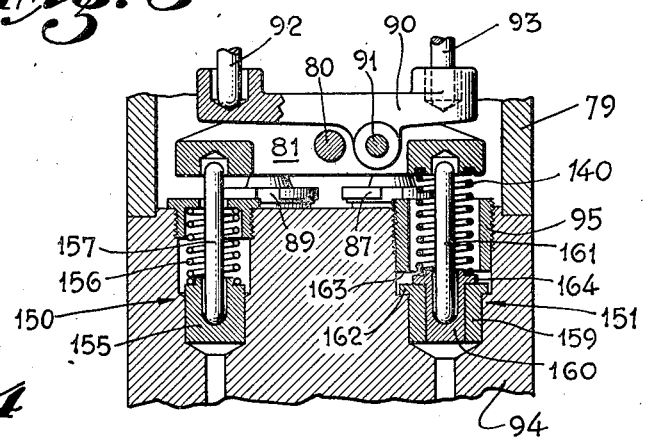
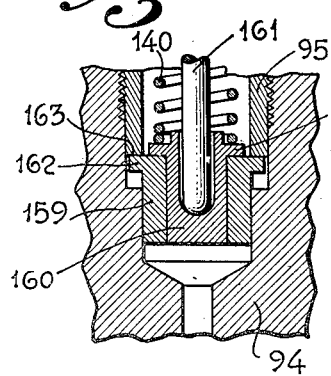 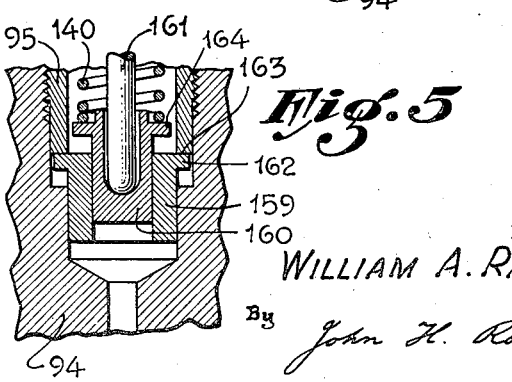
Inventor:
WILLIAM A. RAY,
By John H. Rouse,
Attorney.

Patented Apr. 9, 1946

2,398,158

UNITED STATES PATENT OFFICE 2,398,158

CONTROL SYSTEM

William A. Ray, Los Angeles, Calif., assignor to General Controls Co., a corporation Application March 1, 1943, Serial No. 477,534

5 Claims. (Cl. 236—86)

My present invention relates to apparatus for operating a control member, such as valve operating means or a switch arm, and has for an object the provision of means for moving the member in opposite directions and also for causing it to assume a predetermined position intermediate its limits of movement. This application is a continuation-in-part of my copending application, Serial No. 441,773, filed May 5, 1942, now Patent No. 2,364,659, dated Dec. 12, 1944.

Another object is to provide a pair of operators for moving the control member respectively in opposite directions, and means whereby the member is rigidly held in a predetermined position when both of the operators are simultaneously energized.

Another object is to provide means, of the character described in the preceding objects, wherein one of the operators comprises a pair of elements whose combined operating forces are greater than that of the other of the operators, the operative movement of one of the elements being limited, and the operating force of the other of the elements being less than that of the other of the operators, so that the member assumes a predetermined position when both of the operators are simultaneously energized.

A more specific object is to provide apparatus, of the character described in the preceding object, wherein the operators are of the fluid pressure operated type and one of them comprises a pair of pressure responsive elements, the sum of the working areas of which is greater than the working area of the pressure responsive element of the other operator.

While not so limited, the present invention has particular utility in a system which includes a fluid pressure motor having a piston the movement, in either direction, of which is controlled by valve means operated by the control member referred to in the preceding objects; the member when moved to its "predetermined" position being effective to close all the valve means, so that the piston is then maintained in the particular position in which it was when the member was so moved.

Other objects and advantages of the invention will be found in the description, the drawings, and the claims; and, for full understanding of the invention, reference may be had to the following detailed description and accompanying drawings, wherein:

Figure 2 is a transverse sectional view of a valve structure embodying the invention;

Figure 3 is a fragmentary longitudinal section taken along the lines 3—3 of Fig. 2; and Figures 4 and 5 are enlarged fragmentary sections showing the right-hand, or compound, piston of Fig. 3 in different positions which it assumes in operation.

Figure 1:
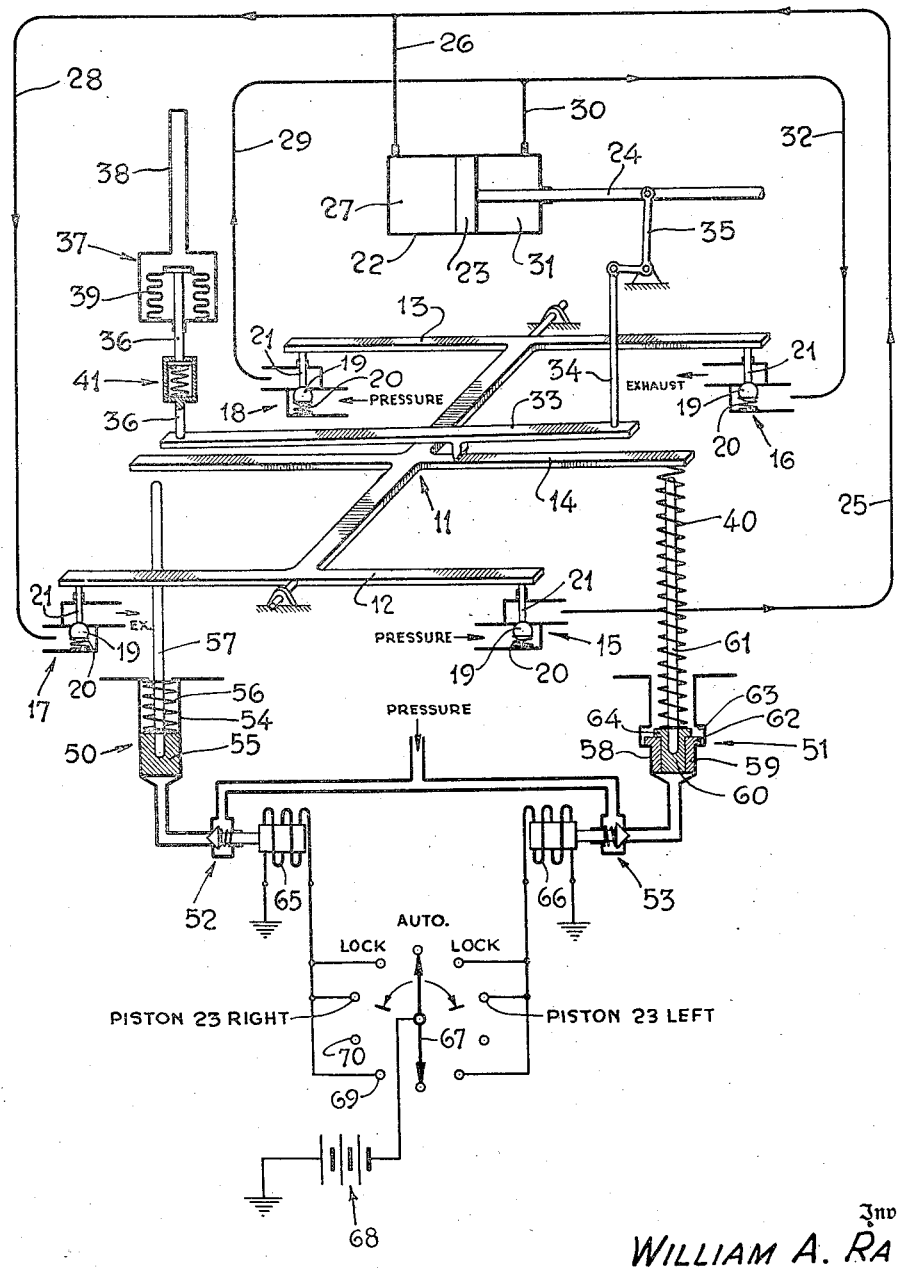
Figure 1 is a diagrammatic view of a control system embodying my invention.

The system shown in Fig. 1 is generally the same as that disclosed in my above-mentioned copending application, Serial No. 441,773, the part of the invention claimed in this application being embodied in the fluid pressure operating means shown in the lower portion of the figure.

Referring first more particularly to Fig. 1, the numeral 11 generally indicates a pivoted rocker comprising a front and a back arm 12 and 13, respectively, and a middle arm 14. Arranged to be simultaneously actuated by the right-hand ends of the front and back arms of the rocker is a pair of valves 15 and 16; and, in a like manner, another pair of valves 17 and 18 is provided for actuation by the left-hand ends of these arms. The valve 15 comprises a ball 19 biased upwardly to seating position by a spring 20; a stem 21, extending through the top wall of the valve, providing means whereby downward movement of the rocker arm unseats the ball. The structure of the valves 15, 16, 17 and 18 is the same and hence like numerals have been assigned to like parts of all these valves.

The valves 15—18, which constitute a four-way valve when actuated by the rocker 11, are adapted to control the operation of a fluid pressure motor comprising a cylinder 22 wherein is reciprocable a piston 23 having a stem 24 for connection to apparatus to be actuated—such as the flaps or vanes of an airplane which must be positioned to control air flow to the engine, or to the cooling unit therefor, in accordance with the temperature thereof. The outlet of valve 15 is connected by a pipe 25 and branch pipe 26 to the left-hand chamber 27 of cylinder 22; another pipe 28 leading from the branch pipe 26 to the inlet of valve 17. In a similar manner, the outlet of valve 18 is connected by a pipe 29 and branch pipe 30 to the other cylinder chamber 31; another pipe 32 leading from branch pipe 30 to the inlet of valve 16. As is indicated by the legends, the inlets of valves 15 and 18 are connected to a source of pressure fluid, which source may be common to both valves; and the outlets of valves 16 and 17 lead to "exhaust," which may be a return line to the reservoir from which the pressure fluid is drawn, if the fluid is of the liquid type commonly employed in aircraft control systems.

When the rocker 11 is in its normal position, as shown in the drawings, all the valves 15—18 are closed, there then being a slight clearance between the valve stems 21 and the respective adjacent ends of the arms 12 and 13. For actuating the rocker there is provided a lever 33 which is fulcrumed adjacent its ends on the middle arm 14 of the rocker at a point thereon spaced from its axis of rotation. Engaging the right-hand end of the lever 33 is a rod 34 which is connected at its upper end to a bell-crank 35 connected to the operating stem 24 of the fluid pressure motor. The left-hand end of the lever is in engagement with the stem 36 of a thermostatic device 37, of the fluid pressure type, which comprises a thermal bulb 38 and a bellows 39, to the head of which the stem 36 is connected. The lever 33 is normally maintained in engagement with rod 34 and stem 36 by the force of a compression spring 40 acting upwardly thereon through the arm 14 of the rocker. The upper and lower portions of the stem 36 are interconnected by a strain-release device 41, of the spring-loaded type, which is non-yielding in normal automatic operation of the system, but serves a purpose hereinafter to be described.

In the operation of the system thus far described, it will be assumed that the thermostatic device 37 is responsive to the temperature at the engine (or cooling unit therefor) of an airplane, the air-controlling flaps of which are to be positioned in accordance with that temperature by the stem 24 of the fluid pressure motor. Upon rise of temperature of the thermal bulb 38, the resultant downward movement of stem 36 tends to rock lever 33 counterclockwise; however, since free movement of this lever is restrained by the rod 34, it rocks rather about the end of this rod as a fulcrum, thereby effecting clockwise rotation of the rocker 11, through its pivotal connection with the arm 14 thereof. The resultant opening of the right-hand pair of valves 15—16 permits pressure fluid to pass through valve 15, and pipes 25—26, to the motor chamber 27; the fluid in the other chamber 31 simultaneously discharging through the other open valve 16 by way of pipes 30 and 32. (The other pair of valves 17—18 now being closed, there can be no flow through pipes 28 and 29.) The resultant movement of piston 23 in a right-hand direction effects wider opening of the air-controlling flaps, and also acts through bell-crank 35 to raise the rod 34, thereby permitting the rocker 11 to return to its original position under the influence of spring 40 (lever 33 now being effectively fulcrumed on the end of stem 36) so that, since all the valves 15—18 are closed, movement of piston 23 is arrested; lever 33 assuming a different angular position with respect to the rocker due to the elevation of rod 34.

Should the temperature of the thermal bulb 38 now decrease, the resultant rise of stem 36 permits the rocker 11 to rotate in a counterclockwise direction under the influence of spring 40, thereby effecting opening of the left-hand pair of valves 17—18. This results in the application of pressure fluid to the chamber 31 of the motor and discharge of fluid from chamber 27, so that the piston 23 now moves in a left-hand direction; its movement again being arrested due to the "follow-up" connection between the piston stem 24 and the valve-actuating system, which acts to restore the rocker to its normal or neutral position; the new angular position of lever 33 being determined by the positions of rod 34 and stem 36. It is to be understood that the piston can move to the limit of its travel in either direction if the temperature of the thermal bulb becomes such that it should, the follow-up rod 34 then moving substantially in accordance with the movement of stem 36.

In the lower portion of Fig. 1 there is shown "overriding" means for operating the four-way-valve rocker 11 independently of the automatic thermostatic control system hereinabove described, and irrespective of the temperature of the thermal bulb. The overriding means include a pair of operators 50 and 51, the supply of pressure fluid for the operation of which is respectively controlled by a pair of normally-closed electromagnetically operated valves 52 and 53. The source of pressure fluid for the operators may conveniently be the same as that provided for operating the motor piston 23. In connection with the operation of the air-controlling flaps of an airplane, the purpose of the "override" is to enable the pilot to move the flaps to some desired position and to lock them in that position irrespective of the temperature of the engine. The override has particular utility in setting the flaps before take-off, or in some flight-operations—or upon failure of the automatic control.

The left-hand operator 50 comprises a cylinder 54 having a piston 55 reciprocable therein and downwardly biased by a spring 56. The piston carries a stem 57, the top end of which is normally spaced below the left hand end of rocker arm 14 a distance such that it does not interfere with the movement of the rocker. If valve 52 is opened, the fluid pressure then applied to the bottom of piston 55 causes upward movement of stem 57 into engagement with arm 14 and clockwise rotation of rocker 11; the resultant opening of the right-hand pair of valves 15—16 effecting movement of the motor piston 23 in a right-hand direction. It will be noted that the lever 33 cannot interfere with such clockwise rotation of the rocker inasmuch as the movement of the rocker is then in a direction away from the fulcrum point of the lever. When valve 52 is subsequently closed, the piston returns to its depressed position under the force of the bias spring 56; there being sufficient clearance between the piston and the cylinder to permit the fluid trapped below the piston to escape.

The other operator 51 comprises a cylinder 58 wherein is reciprocable a pair of pistons 59 and 60. The inner piston 60 is slidable in a central bore through the outer piston 59, and carries a stem 61 for engagement with the right-hand end of rocker arm 14 and normally spaced therefrom by a distance such that it does not interfere with the operation of the rocker. The rocker bias-spring 40 also serves as a bias for the pistons of operator 51. If valve 53 is opened, the resultant application of fluid pressure to the pistons 59—60 effects counterclockwise rotation of the rocker by stem 61 (the strain-release device 41 yielding to permit the necessary upward movement of lever 33), the motor piston 23 now moving in a left-hand direction due to the opening of valves 17—18. When valve 53 is closed, leakage of fluid around the pistons permits them to return to normal position under the force of the bias spring 40. It will be noted that the upward movement of the outer piston 59 is limited by the engagement of the outer flange 62 thereof with a shoulder 63 formed in the upper extension of the cylinder 58. When the outer piston is in that limited position—and while flange 64 of the inner piston is in engagement with the top of the outer piston—the stem 61 extends just far enough to reach the arm 14 of the rocker when the same is in its neutral position (wherein all of valves 15—18 are closed). However, under the pressure of the fluid the inner piston moves somewhat farther (out of abutting engagement with the outer piston) to effect rotation of the rocker.

The working area of the piston 55 of operator 50 is greater than that of the inner piston 60 of operator 51, but less than that of the outer piston 59 of that operator—and the rotational forces produced on the rocker by the individual pistons are in that ratio since each acts on the rocker at the same distance from its axis, and each is subjected to fluid pressure from a common source. Therefore, if both of the operators 50 and 51 are simultaneously energized by opening valves 52 and 53, the force of operator 50 will predominate over that of the inner piston 60 of operator 51 and effect its engagement with the outer piston 59. However, due to its greater area, the outer piston will assume its limited position in engagement with the shoulder 63; the position of stem 61 then being such that the rocker 11 is in its neutral position (as was mentioned above) and is rigidly held there by the opposing forces produced by the two operators. It is to be understood that, due to the yieldability of the strain-release device 41, the force producible on the rocker by the thermostatic device 37 is incapable of moving the rocker from the position in which it is held by the operators when they are operated independently or simultaneously. In the neutral position of the rocker, all the valves 15—18 are closed so that the motor piston 23 is then "locked" in the position in which it happened to be when both of the operators were simultaneously energized.

Summarizing the above: when operator 50 (only) is energized, the motor piston 23 travels toward the right; when operator 51 (only) is energized, the motor piston travels toward the left; and when both of the operators 50 and 51 are simultaneously energized, movement of the motor piston is arrested. Assuming that the rate of movement of the motor piston is such that its travel between extreme positions occupies several seconds—as is the case in a conventional hydraulic motor as employed in airplanes—one can readily determine when the piston has reached the desired position in response to the opening of one or the other of the operator valves 52 and 53. When the piston is in that position, the unopen one of the valves 52—53 is also opened—with the result that the motor piston is immediately locked in its selected position.

In the bottom portion of Fig. 1 there is shown a switching system suitable for controlling the operation of the electromagnetic valves 52 and 53. One terminal of each of the energizing coils 65 and 66 of the valves is grounded, the other of the coil terminals each leading to a series of contact points engageable by a rotatable double-ended switch arm 67 which is connected to ground in series with a suitable source of electrical energy 68. When the switch arm is in the position shown, neither of the valves is energized and the system is therefore then under the automatic control of the thermostatic device 37—as is indicated by the legend "Auto." When the switch arm is rotated clockwise to the contact point indicated by "Lock," current then passes through that contact to the coil of valve 53, and also through the diagonally opposite contact 69 to the coil of valve 52. Continued clockwise rotation of the switch arm effects its engagement with the contact marked "Piston 23 left" so that valve 53 only is energized—the other end of the switch arm then resting on an open contact 70. In a similar manner, counterclockwise rotation of the switch arm effects, successively, energization of both valves, and of valve 52 only.

Referring to Figs. 2-5 of the drawings, the structure shown therein is a fragmentary portion of a modified form of the structure shown in my above-mentioned Patent No. 2,364,659. Pivotally mounted in the upper section 79 of the structure, by a pin 80, is a rocker 81 which corresponds to the rocker 11 shown in the diagram of Fig. 1; the portion of the rocker seen in Fig. 3 corresponding to the middle arm 14. Threaded in the rocker are four screws 82—85 which are adapted, when the rocker is rotated, to operate valve means 86—89, located in the lower section 94 of the structure, which correspond to the valves 15—18 of Fig. 1. Located within a channelled middle portion of the rocker 81 is a lever 90 which is pivotally mounted, by a pin 91, on the rocker at a point spaced from the axis of rotation thereof. The lever 90 corresponds to the lever 33 of Fig. 1 and is shown in engagement with the end portions of a pair of pins 92 and 93 which correspond to the stem 36 and follow-up rod 34, respectively, of Fig. 1. Working in bores formed in the lower section 94 is a pair of fluid pressure operators 150 and 151 which correspond respectively to the operators 50 and 51 of Fig. 1. Since the correspondence of the parts of these operators (as shown in Figs. 3-5 and in the diagram of Fig. 1) is believed to be quite apparent, the parts in Figs. 3-5 have been assigned numerals which are greater by one-hundred than those of the corresponding parts in Fig. 1, and will not further be described. It suffices to point out that an adjustable bushing 95 forms the stop engageable by the outer piston 159 of operator 151.

In Fig. 4, the parts of the operator 151 are shown in the positions which they assume when fluid pressure is simultaneously applied to both of the operators 150 and 151; the outer piston 159 then being in its stopped position with the inner piston 160 rigidly held in engagement therewith by the force of operator 150. In Fig. 5, the parts are in the positions reached when operator 151, only, is energized; the inner piston then being projected out of abutting engagement with the outer piston.

While the respective proportions of the working areas of the pressure responsive elements of the override operators, as shown and described, are those preferred in connection with the operation of the particular control system to which the override is herein applied by way of illustration; I wish it to be understood that it is not essential that the working area of the outer piston 59 of operator 51 be greater than that of the inner piston 60 when one considers only the operation of a "movable member" and ignores any possible unequal resistance offered to its movement—as by the strain-release device 41 which resists movement of the rocker 11 only when the same is rotated counterclockwise by the force of operator 51.

It is only essential (1) that the sum of the forces producible by the elements of the two-element operator be greater than the opposite force producible by the single-element operator; (2) that the movement of one or the other of the elements of the two-element operator be limited, so as to determine its position (and that of the rocker or member operated by it) when both of the operators are simultaneously energized; and (3) that the force producible by the single-element operator be greater than the opposite force producible by that element of the two-element operator whose movement is not so limited. (It is to be understood that the forces referred to are those effective to move the member.) In other words: When both operators are simultaneously energized, the force produced on the member by the element whose movement is limited must be greater than the resultant opposing force produced by both of the other elements. It is thus clear that—while the working area of piston 55 of operator 50 must be greater than that of the inner piston 60 of operator 51—the working area of the outer piston 59 (whose movement is limited) could even be less than that of the inner piston 60, provided that the sum of the areas of pistons 59 and 60 is greater than the area of piston 55—assuming the absence of other forces acting on the rocker. Obviously, when other forces—such as those of the bias springs of valves 15—16, or of the strain-release device 41—can also act on the rocker and hence must be overcome by the override operators, the respective areas of the pistons must be arranged accordingly. In the embodiment of the invention shown in Fig. 1, the opposing forces produced on the rocker by the override operators, when both of them are energized, must be sufficient to hold the rocker so rigidly in its neutral position that the force producible by the thermostatic device is ineffective to move it.

It is apparent that one or both of the override operators could be of other than the fluid pressure type shown, such as the electromagnetic type employing a "floating" plunger; and that the operators could be arranged on opposite sides of one end of a pivoted member, or of a member movable in a rectilinear path. Further, the one of the elements of the two-element operator whose movement is not "limited" could be simply a yieldable element (such as a compression spring) carried by the other of the operator elements.

I wish it to be understood that still further modifications may be made without departing from the spirit of the invention, and that I intend therefore to be limited only by the scope of the appended claims.

I claim as my invention:

1. In a condition control system, in combination: means for varying said condition; a member movable in opposite directions from a neutral position; means operated by the movement of the member in said directions for so controlling said condition-varying means that said condition is varied in correspondingly opposite senses, said controlling means being in unoperated condition when the member is returned to said neutral position so that the condition-varying means is then maintained in its previously-controlled condition; means responsive to said condition for normally automatically actuating said member in accordance with the departure of said condition from that desired; and overriding means for actuating said member independently of said condition-responsive means and so as to render the condition-responsive means ineffective, and comprising a pair of motor means for actuating the member in said opposite directions respectively, said motor means being effective when both are simultaneously energized to actuate said member to said neutral position.

2. A condition control system, as defined in claim 1, wherein said motor means are fluid pressure operated.

3. In a condition control system, in combination: means for varying said condition; a member movable in opposite directions from a neutral position; valve means operated by the movement of the member in said directions for so controlling said condition-varying means that said condition is varied in correspondingly opposite senses, said valve means being in unoperated condition when the member is returned to said neutral position so that the condition-varying means is then maintained in its previously-controlled condition; means responsive to said condition for normally automatically actuating said member in accordance with the departure of the condition from that desired; and overriding means for actuating said member independently of said condition-responsive means and so as to render the condition-responsive means ineffective, and comprising a pair of fluid-pressure motor means for actuating the member in said opposite directions respectively, one of said motor means comprising a pair of elements capable of producing actuating forces on said member greater and less respectively than that producible by the other of the motor means, and means so limiting the operative movement of the greater-force-producing one of said elements that the member is actuated to said neutral position when both of said motor means are simultaneously energized.

4. In a temperature control system, in combination: means for changing said temperature; a member movable in opposite directions from a neutral position; valve means operated by the movement of the member in said directions for so controlling said temperature-changing means that said temperature is changed in correspondingly opposite degrees, said valve means being in unoperated condition when the member is returned to said neutral position so that the temperature-changing means is then maintained in its previously-controlled condition; temperature-responsive means for normally automatically actuating said member in accordance with the departure of the temperature from that desired; and overriding means for actuating said member independently of said temperature-responsive means and so as to render the temperature-responsive means ineffective, and comprising a pair of fluid-pressure motor means for actuating the member in said opposite directions respectively, one of said motor means comprising a pair of elements capable of producing actuating forces on said member greater and less respectively than that producible by the other of the motor means, and means so limiting the operative movement of the greater-force-producing one of said elements that the member is actuated to said neutral position when both of said motor means are simultaneously energized; said temperature-responsive actuating means being yieldable to permit actuation of the member under the force produced by said motor means.

5. In a temperature control system, in combination: means for changing said temperature; a fluid-pressure motor, having a pair of pressure chambers separated by a movable partition, for so operating said temperature-changing means that said temperature is changed in correspondingly opposite degrees when said partition is moved in opposite directions; a four-way valve for controlling the fluid pressure in said chambers; a member movable in opposite directions from a neutral position for so operating said valve that said partition is correspondingly moved in said opposite directions, the member when in said neutral position so conditioning the valve that movement of the partition is arrested; temperature-responsive means for normally automatically actuating said member in accordance with the departure of the temperature from that desired; and overriding means for actuating said member independently of said temperature-responsive means and so as to render the temperature-responsive means ineffective, and comprising a pair of fluid-pressure motor means for actuating the member in said opposite directions respectively, one of said motor means comprising a pair of piston elements capable of producing actuating forces on said member greater and less respectively, than that producible by the other of the motor means, and means so limiting the operative movement of the greater-force-producing one of said piston elements that the member is actuated to said neutral position when both of said motor means are simultaneously energized; said temperature-responsive actuating means being yieldable to permit actuation of the member under the forces producible by said motor means.

WILLIAM A. RAY.